(12) United States Patent
Tomogami (10) Patent No.: US 11,181,150 B2
(45) Date of Patent: Nov. 23, 2021

(54) CONSTANT-VELOCITY UNIVERSAL JOINT

(71) Applicant: NTN CORPORATION, Osaka (JP)

(72) Inventor: Shin Tomogami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 726 days.

(21) Appl. No.: 16/071,237

(22) PCT Filed: Jan. 6, 2017

(86) PCT No.: PCT/JP2017/000348
§ 371 (c)(1),
(2) Date: Jul. 19, 2018

(87) PCT Pub. No.: WO2017/134981
PCT Pub. Date: Aug. 10, 2017

(65) Prior Publication Data
US 2021/0199160 A1 Jul. 1, 2021

(30) Foreign Application Priority Data

Feb. 4, 2016 (JP) .............................. JP2016-019710

(51) Int. Cl.
*F16D 3/224* (2011.01)
*F16D 3/2245* (2011.01)
(Continued)

(52) U.S. Cl.
CPC ............ *F16D 3/2245* (2013.01); *F16B 21/18* (2013.01); *F16D 1/116* (2013.01); *F16D 3/845* (2013.01);
(Continued)

(58) Field of Classification Search
CPC ........ F16D 3/2245; F16D 1/116; F16D 3/845; F16D 2003/22316; F16D 2003/22313;
(Continued)

(56) References Cited

U.S. PATENT DOCUMENTS 2,075,483 A * 3/1937 Trotter .................. E21B 17/046
403/328
4,433,934 A * 2/1984 Cleveland ............... F16D 1/116
403/328
(Continued)

FOREIGN PATENT DOCUMENTS

DE         923 757    *  9/1956    ..................... 403/328
DE         28 30 945  *  1/1980    ..................... 403/328
(Continued)

OTHER PUBLICATIONS

International Preliminary Report on Patentability and Written Opinion of the International Searching Authority dated Aug. 7, 2018 in International (PCT) Application No. PCT/JP2017/000348.
(Continued)

*Primary Examiner* — Greg Binda
(74) *Attorney, Agent, or Firm* — Wenderoth, Lind & Ponack, L.L.P.

(57) ABSTRACT

A constant velocity universal joint includes an outer joint member and an inner joint member between which torque is transferred through intermediation of balls while allowing angular displacement. A power transmission shaft is coupled to the inner joint member to allow torque transmission therebetween. A mounting and dismounting mechanism configured to mount and dismount the power transmission shaft to and from the inner joint member is provided between the inner joint member and the power transmission shaft. The mounting and dismounting mechanism includes a tubular member, a snap ring mounted inside the tubular member, a pushing member arranged on a radially outer side of the snap ring to be movable in a radial direction, and an annular member arranged on an outer peripheral surface of the tubular member to be movable in an axial direction.

5 Claims, 6 Drawing Sheets

(51) Int. Cl.
*F16B 21/18* (2006.01)
*F16D 1/116* (2006.01)
*F16D 3/84* (2006.01)
*F16D 3/223* (2011.01)

(52) U.S. Cl.
CPC ............ *F16D 2003/22313* (2013.01); *F16D 2003/22316* (2013.01); *Y10S 464/901* (2013.01); *Y10S 464/906* (2013.01); *Y10T 403/604* (2015.01)

(58) Field of Classification Search
CPC ............ Y10T 403/604; Y10S 464/901; Y10S 464/906; F16B 21/18
USPC .......................................................... 464/182
See application file for complete search history.

(56) References Cited

U.S. PATENT DOCUMENTS 5,964,664 A * 10/1999 Cook ..................... F16D 3/32
2010/0143075 A1 6/2010 Disser
2014/0349771 A1 11/2014 Oh

FOREIGN PATENT DOCUMENTS

JP 5174153 4/2013
JP 5818390 11/2015

OTHER PUBLICATIONS

International Search Report dated Mar. 21, 2017 in International (PCT) Application No. PCT/JP2017/000348.

* cited by examiner

FIG. 8 ive patent text

CONSTANT-VELOCITY UNIVERSAL JOINT

TECHNICAL FIELD

The present invention relates to a constant velocity universal joint, which is to be used in power transmission systems for automobiles and various industrial machines, in particular, is to be mounted to a propeller shaft for an automobile.

BACKGROUND ART

As a constant velocity universal joint which is used as a unit configured to transmit a rotational force at constant velocity from an engine to a wheel of an automobile, there are given two types, specifically, a fixed type constant velocity universal joint and a plunging type constant velocity universal joint. Both of those constant velocity universal joints each have a structure capable of coupling two shafts on a driving side and a driven side to each other, and transmitting rotational torque at constant velocity even when each of the two shafts forms an operating angle.

It is required that a propeller shaft to be mounted to an automobile such as a 4WD vehicle or a FR vehicle be adaptable to angular displacement and axial displacement caused by a change in relative positional relationship between a transmission and a differential. Therefore, in general, the propeller shaft has the following structure. Specifically, the fixed type constant velocity universal joint which allows only the angular displacement is installed on the transmission side, and the plunging type constant velocity universal joint which allows both the axial displacement and the angular displacement is installed on the differential side. Both the constant velocity universal joints are coupled to each other through intermediation of the propeller shaft made of steel.

The fixed type constant velocity universal joint includes an outer joint member, an inner joint member, a plurality of balls, and a cage. A power transmission shaft being an output shaft extending from the transmission is coupled to a shaft hole of the inner joint member by spline fitting so as to allow torque transmission therebetween. The power transmission shaft is retained by a snap ring so as to prevent removal from the inner joint member.

Hitherto, various structures have been proposed as a coupling structure for the power transmission shaft and the constant velocity universal joint in the propeller shaft (for example, see Patent Literatures 1 and 2).

The coupling structure disclosed in Patent Literature 1 has the following structure. Specifically, the inner joint member of the constant velocity universal joint is provided so as to extend to the power transmission shaft side in an axial direction, and the inner joint member and the power transmission shaft are fixed to each other by the snap ring at a part other than the spline fitting portion between the inner joint member and the power transmission shaft.

Further, the coupling structure disclosed in Patent Literature 2 has the following structure. Specifically, a drive sleeve is coupled to the inner joint member of the constant velocity universal joint by spline fitting so as to allow torque transmission therebetween. A drive nut is coupled to the power transmission shaft, and the drive nut is fitted to the drive sleeve.

CITATION LIST

Patent Literature 1: JP 5174153 B2
Patent Literature 2: JP 5818390 B2

SUMMARY OF INVENTION

Technical Problem

Incidentally, in the above-mentioned propeller shaft, in order to perform component replacement or maintenance and inspection for the constant velocity universal joint, it is required that the constant velocity universal joint be mountable to and dismountable from the power transmission shaft of the transmission. In the case of the coupling structures for the power transmission shaft and the constant velocity universal joint as disclosed in Patent Literatures 1 and 2, the following problems arise.

In the case of the coupling structure disclosed in Patent Literature 1, in order that the power transmission shaft and the inner joint member of the constant velocity universal joint be separable while ensuring the durability of the power transmission shaft against removal, the snap ring and a snap ring groove are to be chamfered or rounded.

However, in order to stabilize the retainability by the snap ring, it is required to design and manage the shape and the dimensions of chamfering or the like for the snap ring and the snap ring groove, which is extremely difficult, and it is difficult to design and manage optimum shape and dimensions.

In the case of the coupling structure disclosed in Patent Literature 2, the drive nut of the power transmission shaft is fitted to the drive sleeve extending from the inner joint member of the constant velocity universal joint. In this manner, the constant velocity universal joint can reliably be fixed to the power transmission shaft, and the constant velocity universal joint can easily be separated from the power transmission shaft.

However, in the case of the fitting structure by the drive sleeve and the drive nut, components of the drive sleeve and the drive nut are required. As a result, the number of components in the propeller shaft is increased, which may result in increase in cost of the propeller shaft.

Therefore, the present invention has been proposed in view of the above-mentioned problems, and has an object to provide a constant velocity universal joint in which an inner joint member and a power transmission shaft can reliably be fixed to each other and can easily be separated from each other with a simple structure.

Solution to Problem

According to one embodiment of the present invention, there is provided a constant velocity universal joint, comprising: an outer joint member; and an inner joint member, which is configured to transmit torque between the inner joint member and the outer joint member through intermediation of torque transmission members while allowing angular displacement, wherein a power transmission shaft is coupled to the inner joint member so as to allow torque transmission therebetween, wherein a mounting and dismounting mechanism configured to mount and dismount the power transmission shaft to and from the inner joint member is provided between the inner joint member and the power transmission shaft.

As a technical measure to achieve the above-mentioned object, according to one embodiment of the present invention, the mounting and dismounting mechanism comprises: a tubular member, which is inserted externally on the power transmission shaft so as to extend to the power transmission shaft side of the inner joint member; a snap ring, which is mounted inside the tubular member, and is capable of being reduced in diameter; a pushing member, which is arranged on a radially outer side of the snap ring so as to be movable in a radial direction; and an annular member, which is arranged on an outer peripheral surface of the tubular member so as to be movable in an axial direction, and wherein the pushing member that is exposed from the outer peripheral surface of the tubular member along with movement of the annular member in the axial direction is moved in the radial direction so that the snap ring is mountable to and dismountable from the power transmission shaft.

In the present invention, fixation and separation of the power transmission shaft and the inner joint member are performed by the mounting and dismounting mechanism comprising the tubular member, the snap ring, the pushing member, and the annular member in the manner described below.

In the fixation of the power transmission shaft and the inner joint member, the annular member is moved in a direction of approaching the pushing member. With this, the pushing member exposed from the outer peripheral surface of the tubular member is moved to the radially inner side. The snap ring that is reduced in diameter along with the movement of the pushing member in the radial direction is locked to the power transmission shaft. In this manner, the fixation is achieved.

In the separation of the power transmission shaft and the inner joint member, the annular member is moved in the direction of separating from the pushing member so that the annular member is separated from the pushing member. With this, the snap ring is increased in diameter by an elastic force, and the increase in diameter of the snap ring cancels the locked state of the snap ring with respect to the power transmission shaft. At this time, the pushing member is moved to the radially outer side to be exposed from the outer peripheral surface of the tubular member.

According to one embodiment of the present invention, it is desired that the mounting and dismounting mechanism have a locking groove at an end portion of the inner joint member, and a locking claw at an end portion of the tubular member, and that the locking claw of the tubular member be fitted in the locking groove of the inner joint member so that the inner joint member and the tubular member are coupled to each other.

Through employment of such a structure, the tubular member can be provided as a separate member from the inner joint member being a component of the constant velocity universal joint. Thus, the tubular member can easily be manufactured.

According to one embodiment of the present invention, it is desired that, in the mounting and dismounting mechanism, an annular recessed groove be formed in an outer peripheral surface of the power transmission shaft, that an annular recessed groove be formed in an inner peripheral surface of the tubular member in conformity with the recessed groove of the power transmission shaft, and that the snap ring be fitted in the recessed groove of the power transmission shaft and the recessed groove of the tubular member.

Through employment of such a structure, the snap ring in a state of being increased in diameter is fitted in the recessed groove of the tubular member. In this manner, the snap ring is easily mounted inside the tubular member. Further, the snap ring in a state of being reduced in diameter is fitted in the recessed groove of the power transmission shaft. In this manner, the snap ring is easily locked to the power transmission shaft.

According to one embodiment of the present invention, it is desired that, in the mounting and dismounting mechanism, through holes, which are opened to inner and outer peripheries of the tubular member, be formed at a plurality of positions of the tubular member in a circumferential direction, that spherical pushing members be arranged in the through holes, that radially inner sides of the pushing members be brought into abutment against the snap ring, and that radially outer sides of the pushing members be allowed to freely protrude and retreat with respect to openings on the outer peripheral sides of the through holes.

Through employment of such a structure, the spherical pushing members are arranged in the through holes of the tubular member. In this manner, at the time of fixing the power transmission shaft and the inner joint member, the snap ring is easily reduced in diameter through movement of the pushing member to the radially inner side. Further, at the time of separating the power transmission shaft and the inner joint member, through movement of the pushing member to the radially outer side, the pushing member is easily protruded from the tubular member.

According to one embodiment of the present invention, it is desired that, in the mounting and dismounting mechanism, the annular member be mounted to an end portion of a boot configured to close an opening of the outer joint member.

Through employment of such a structure, the annular member has a seal function of preventing leakage of lubricant sealed inside the joint and preventing entry of foreign matters from outside the joint, which is exerted by the boot, and a mounting/dismounting function of fixing and separating the power transmission shaft and the inner joint member, which is exerted by the mounting and dismounting mechanism.

Advantageous Effects of Invention

According to the present invention, the mounting and dismounting mechanism, which is configured to mount and dismount the power transmission shaft to and from the inner joint member, comprises the tubular member, the snap ring, the pushing member, and the annular member. Thus, the inner joint member and the power transmission shaft can reliably be fixed to each other and can easily be separated from each other with a simple structure. As a result, the degree of freedom in design of the mounting and dismounting mechanism can be enhanced, and the constant velocity universal joint can be reduced in cost without increasing the number of components.

DESCRIPTION OF EMBODIMENTS

Now, a constant velocity universal joint according to an embodiment of the present invention is described in detail with reference to the drawings.

In the embodiment described below, a Rzeppa type constant velocity universal joint (BJ) being one of fixed type constant velocity universal joints to be mounted to a propeller shaft for an automobile is exemplified. However, the present invention is also applicable to an undercut-free type constant velocity universal joint (UJ) being another one of the fixed type constant velocity universal joints. Further, the present invention is also applicable to a plunging type constant velocity universal joint such as a double-offset type constant velocity universal joint (DOJ), a cross-groove type constant velocity universal joint (LJ), or a tripod type constant velocity universal joint (TJ).

It is required that a propeller shaft to be mounted to an automobile such as a 4WD vehicle or a FR vehicle be adaptable to angular displacement and axial displacement caused by a change in relative positional relationship between a transmission and a differential. Therefore, in general, the propeller shaft has the following structure. Specifically, the fixed type constant velocity universal joint which allows only the angular displacement is installed on the transmission side, and the plunging type constant velocity universal joint which allows both the axial displacement and the angular displacement is installed on the differential side. Both the constant velocity universal joints are coupled to each other through intermediation of the propeller shaft made of steel.

Figure 1:
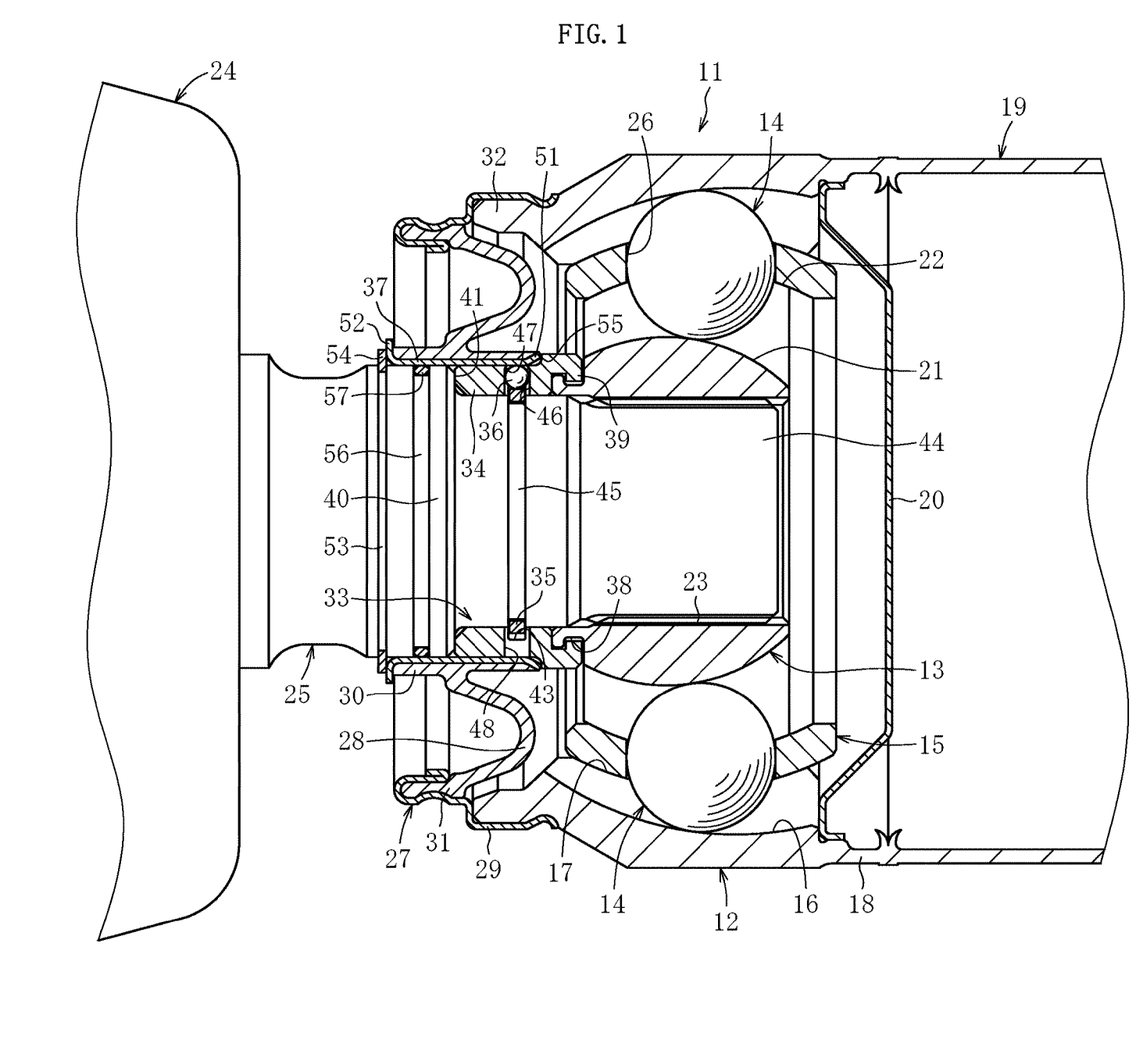
FIG. 1 is a sectional view for illustrating an overall configuration of a constant velocity universal joint according to an embodiment of the present invention.

As illustrated in FIG. 1, a fixed type constant velocity universal joint 11 according to this embodiment (hereinafter simply referred to as "constant velocity universal joint") mainly comprises an outer joint member 12, an inner joint member 13, a plurality of balls 14 being torque transmission members, and a cage 15.

The outer joint member 12 has arc-shaped track grooves 16. The arc-shaped track grooves 16 extend in an axial direction, and are formed equiangularly at a plurality of positions in a spherical inner peripheral surface 17. A tubular propeller shaft 19 is coaxially coupled to one opening end portion 18 of the outer joint member 12 by friction welding or the like so as to allow torque transmission therebetween. Further, a seal plate 20 is mounted to the opening end portion 18 through press fitting so as to seal lubricant such as grease inside the outer joint member 12.

The inner joint member 13 has arc-shaped track grooves 21. The arc-shaped track grooves 21 extend in an axial direction so as to be paired with the track grooves 16 of the outer joint member 12, and are formed equiangularly at a plurality of positions in a spherical outer peripheral surface 22. A power transmission shaft 25 being an output shaft extending from a transmission 24 is coupled to a shaft hole 23 of the inner joint member 13 by spline fitting so as to allow torque transmission therebetween. The power transmission shaft 25 is mountable to and dismountable from the inner joint member 13 by a mounting and dismounting mechanism 33.

The balls 14 are interposed between the track grooves 16 of the outer joint member 12 and the track grooves 21 of the inner joint member 13. The balls 14 are configured to transmit rotational torque between the outer joint member 12 and the inner joint member 13. The number of the balls 14 may be six, eight, or other numbers, and may suitably be set.

The cage 15 is interposed between the inner peripheral surface 17 of the outer joint member 12 and the outer peripheral surface 22 of the inner joint member 13. The cage 15 has a plurality of pockets 26. The pockets 26 are configured to retain the balls 14, and are formed equiangularly at a plurality of positions in the cage 15.

In the constant velocity universal joint 11 having the above-mentioned configuration, when an operating angle is formed by the propeller shaft 19 between the outer joint member 12 and the inner joint member 13, the balls 14 retained in the cage 15 are always maintained within a plane obtained by bisection of the operating angle at any operating angle. Accordingly, constant velocity is secured between the outer joint member 12 and the inner joint member 13. Rotational torque is transmitted between the outer joint member 12 and the inner joint member 13 through intermediation of the balls 14 under the state in which the constant velocity is secured therebetween.

The constant velocity universal joint 11 has a structure in which a seal mechanism 27 is mounted between the outer joint member 12 and the power transmission shaft 25 in order to prevent leakage of the lubricant sealed inside the outer joint member 12 and entry of foreign matters from an outside. The lubricant is sealed in the internal space of the outer joint member 12. With this, the lubricity at a sliding portion inside the joint is ensured at the time of an operation during which the power transmission shaft 25 is rotated while forming an operating angle with respect to the outer joint member 12.

The constant velocity universal joint 11 fora propeller shaft is high in rotation speed and small in operating angle. Thus, the above-mentioned seal mechanism 27 comprises a boot 28 made of rubber, a metal ring 29, and an annular member 37.

The boot 28 comprises a small-diameter end portion 30 and a large-diameter end portion 31, and has a shape of being folded back at the middle into a U-shape. One end portion of the metal ring 29 is fixed to an outer peripheral surface of an opening end portion 32 of the outer joint member 12 by press fitting, and another end portion thereof is fixed to the large-diameter end portion 31 of the boot 28 by caulking. The small-diameter end portion 30 of the boot 28 is integrally fixed to the annular member 37 by vulcanization bonding. The annular member 37 forms a part of the seal mechanism 27, and forms a part of the mounting and dismounting mechanism 33.

In the propeller shaft in which the constant velocity universal joint 11 is assembled to the propeller shaft 19, in order to perform component replacement or maintenance and inspection for a propeller shaft, it is required to provide the mounting and dismounting mechanism 33 for mounting and dismounting the constant velocity universal joint 11 to and from the power transmission shaft 25 of the transmission 24. The constant velocity universal joint according to this embodiment comprises the mounting and dismounting mechanism 33 having the structure as described below.

Figure 2:
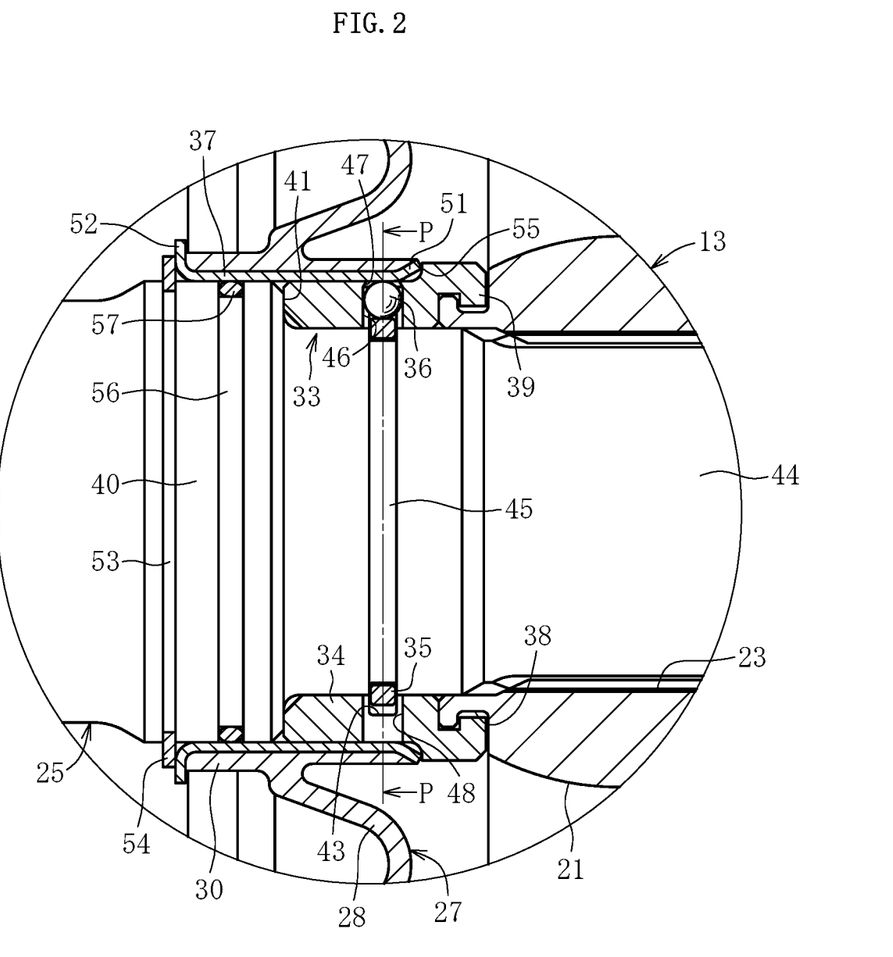
FIG. 2 is an enlarged sectional view of a main part of FIG. 1.

As illustrated in FIG. 1 and FIG. 2, the mounting and dismounting mechanism 33 is provided between the inner joint member 13 of the constant velocity universal joint 11 and the power transmission shaft 25 of the transmission 24, and mainly comprises a tubular member 34, a snap ring 35, pushing members 36, and the annular member 37.

The tubular member 34 is inserted externally on the power transmission shaft 25 so as to extend to the power transmission shaft 25 side of the inner joint member 13. An annular locking groove 38 is formed in an outer peripheral surface of a projecting end portion of the inner joint member 13, which is located on the transmission 24 side, and an annular locking claw 39 is formed on an inner peripheral surface of an end portion of the tubular member 34, which is located on the propeller shaft 19 side.

The locking claw 39 of the tubular member 34 is fitted in the locking groove 38 of the inner joint member 13. In this manner, the inner joint member 13 and the tubular member 34 are coupled to each other. Under the state in which the tubular member 34 is coupled to the inner joint member 13, the tubular member 34 is regulated in position in the axial direction by a stepped surface 41 of a large-diameter portion 40 of the power transmission shaft 25.

In this embodiment, the tubular member 34 being a separate member from the inner joint member 13 being a component of the constant velocity universal joint 11 is exemplified. However, the tubular member 34 may be formed integrally with the inner joint member 13. When the tubular member 34 is formed as a separate member from the inner joint member 13, the tubular member 34 is easily manufactured in terms of ease of processing.

As the material of the tubular member 34, there is given, for example, low-carbon steel, brass, aluminum, or resin, and the material of the tubular member 34 is not limited as long as the material has required durability against a force in the axial direction (for example, about 2,000 N at the maximum) and does not cause deformation or breakage of the locking claw 39.

Figure 3:
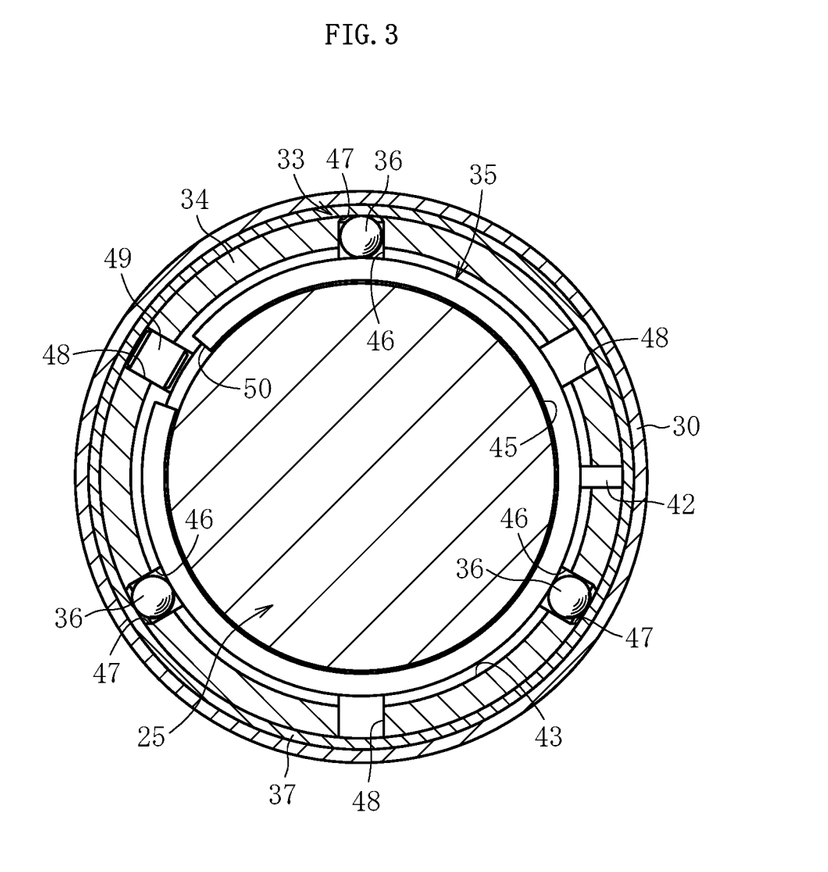
FIG. 3 is a sectional view taken along the line P-P of FIG. 2.

Further, as illustrated in FIG. 3, a slit 42 extending in the axial direction is formed at one position of the tubular member 34 in the circumferential direction. When the tubular member 34 is to be coupled to the inner joint member 13, the locking claw 39 of the tubular member 34 is easily fitted in the locking groove 38 by causing the locking claw 39 to override the projecting end portion of the inner joint member 13 while slightly increasing the diameter of the tubular member 34 utilizing the slit 42.

Under the state in which the tubular member 34 is assembled, even when such slit 42 is formed, the outer periphery of the tubular member 34 is restrained by the annular member 37. Thus, such a situation that the slit 42 is expanded to increase the diameter of the tubular member 34 is not caused.

In this embodiment, the locking claw 39 is formed on the inner peripheral surface of the tubular member 34, and the locking groove 38 is formed in the outer peripheral surface of the inner joint member 13. With this, the tubular member 34 and the inner joint member 13 are fitted to each other while increasing the diameter of the tubular member 34. However, as another method, a locking claw may be formed on the outer peripheral surface of the tubular member 34, and a locking groove may be formed in the inner peripheral surface of the inner joint member 13. With this, the tubular member 34 and the inner joint member 13 may be fitted to each other by reducing the diameter of the tubular member 34 utilizing the slit 42.

The snap ring 35 is a C-shaped member, which can be reduced in diameter, and is mounted inside the tubular member 34 (see FIG. 3). An annular recessed groove 43 is formed in the inner peripheral surface of the tubular member 34, and the snap ring 35 is fitted in the recessed groove 43. In this manner, the snap ring 35 is mounted inside the tubular member 34.

As illustrated in FIG. 1 and FIG. 2, the dimension of the snap ring 35 and the inner diameter dimension of the recessed groove 43 of the tubular member 34 are set so that, when the snap ring 35 is increased in diameter, the entire snap ring 35 is received in the recessed groove 43 of the tubular member 34, and that, when the snap ring 35 is reduced in diameter, the outer peripheral side of the snap ring 35 is received in the recessed groove 43 of the tubular member 34. As described above, the snap ring 35 in the state of being increased in diameter is fitted in the recessed groove 43 of the tubular member 34. In this manner, the snap ring 35 is easily mounted inside the tubular member 34.

Meanwhile, an annular recessed groove 45 is formed in the outer peripheral surface of the power transmission shaft 25, which is located between a spline fitting portion 44 and the large-diameter portion 40, so as to be aligned with the recessed groove 43 of the tubular member 34 in position in the axial direction, and the snap ring 35 is fitted in the recessed groove 45. In this manner, the snap ring 35 is locked to the power transmission shaft 25.

The size of each of the pushing members 36 is set so that, when the snap ring 35 is increased in diameter, the snap ring 35 is not received in the recessed groove 45 of the power transmission shaft 25, and that, when the snap ring 35 is reduced in diameter, the inner peripheral side of the snap ring 35 is received in the recessed groove 45 of the power transmission shaft 25. As described above, the snap ring 35 in the state of being reduced in diameter is fitted in the recessed groove 45 of the power transmission shaft 25. In this manner, the snap ring 35 is easily locked to the power transmission shaft 25.

The pushing members 36 are arranged on the radially outer side of the snap ring 35 so as to be movable in the radial direction. In this embodiment, as illustrated in FIG. 3, a plurality of (three) spherical bodies (steel balls) are exemplified. Through holes 46 that are opened to the inner and outer peripheries of the tubular member 34 are formed at a plurality of positions (three positions at an interval of 120°) of the tubular member 34 in the circumferential direction, and the spherical pushing members 36 are arranged in the through holes 46.

With this, as illustrated in FIG. 1 and FIG. 2, the radially inner sides of the pushing members 36 are brought into abutment against the snap ring 35, and radially outer sides of the pushing members 36 are allowed to freely protrude and retreat with respect to openings 47 of the through holes 46 on the outer peripheral side. It is preferred that the number of the pushing members 36 be three or more so as to reduce the diameter of the snap ring 35 evenly.

The spherical pushing members 36 are arranged in the through holes 46 of the tubular member 34 as described above. Thus, at the time of fixing the power transmission shaft 25 and the inner joint member 13, the snap ring 35 is easily reduced in diameter through movement of the pushing members 36 to the radially inner side. Further, at the time of separating the power transmission shaft 25 and the inner joint member 13, the pushing members 36 are easily protruded from the tubular member 34 through movement of the pushing members 36 to the radially outer side.

Each of the through holes 46 formed in the tubular member 34 is reduced in diameter at each of the openings 47 on the outer peripheral side of the tubular member 34, and has an inner diameter slightly smaller than an outer diameter of each of the pushing members 36.

With this, under the state in which the pushing members 36 are not restrained by the annular member 37 on the radially outer side due to movement of the annular member 37 in the axial direction (see FIG. 5), when the pushing members 36 are moved to the radially outer side by an elastic force of the snap ring 35 to be exposed to the outer peripheral surface of the tubular member 34, the pushing members 36 are prevented from dropping off to the outer side of the tubular member 34.

The through holes 46 that are reduced in diameter on the outer peripheral side of the tubular member 34 are required to be formed as described above. Thus, as illustrated in FIG. 3, releasing holes 48 having the same inner diameter on the inner and outer peripheral sides of the tubular member 34 are formed so as to penetrate at positions opposite to those of the through holes 46 by 180° in the circumferential direction.

The pushing members 36 are not arranged in the releasing holes 48. It is difficult to process the through holes 46, which are reduced in diameter on the outer peripheral side of the tubular member 34, from the outer peripheral side of the tubular member 34. Thus, through insertion of a drill or the like through the releasing holes 48, the through holes 46 can be processed.

Further, a pin 49 protruding to the recessed groove 43 of the tubular member 34 is mounted to one of the above-mentioned releasing holes 48.

The tubular member 34 is made of a material having high elasticity such as resin. With this, when the diameter-reducing shape of the openings 47 (dropping-off prevention of the pushing members 36) is integrally formed, the releasing holes 48 are not required to be formed. In this case, it is only required that one hole for mounting the pin 49 be formed.

With this, a position in the circumferential direction of a cutout portion 50 of the snap ring 35 having a C-shape, which is fitted in the recessed groove 43 of the tubular member 34, is regulated by the pin 49. In this manner, the cutout portion 50 of the snap ring 35 is prevented from being located on the radially inner side of the pushing members 36 so that the snap ring 35 is reduced in diameter evenly in the circumferential direction by the pushing members 36.

As illustrated in FIG. 1 and FIG. 2, the annular member 37 is arranged so as to be movable in the axial direction along the outer peripheral surface of the large-diameter portion 40 of the power transmission shaft 25 and the outer peripheral surface of the tubular member 34. The annular member 37 is integrally mounted to the small-diameter end portion 30 of the boot 28 forming a part of the above-mentioned seal mechanism 27 through vulcanization bonding. The annular member 37 has a tubular shape elongated in the axial direction. An end portion 51 on the propeller shaft side of the annular member 37 is increased in diameter so as to be tapered, and an end portion 52 on the transmission side of the annular member 37 is bent to the radially outer side.

In this embodiment, the boot 28 and the annular member 37 are integrally mounted. However, there may be employed a structure in which the boot and the annular member are formed as separate members, and the small-diameter end portion of the boot is fixed to the annular member utilizing a boot clamp.

Meanwhile, an annular recessed groove 53 is formed on the transmission side on the outer peripheral surface of the large-diameter portion 40 of the power transmission shaft 25, and a snap ring 54 is fitted in the recessed groove 53.

With this, the end portion 51 on the propeller shaft side of the annular member 37 is locked to a stepped portion 55 on the outer peripheral surface of the tubular member 34, and the end portion 52 on the transmission side of the annular member 37 is locked to the snap ring 54. In this manner, the annular member 37 is regulated in position in the axial direction with respect to the power transmission shaft 25 and the tubular member 34.

Further, an annular recessed groove 56 is formed on the propeller shaft side on the outer peripheral surface of the large-diameter portion 40 of the power transmission shaft 25, and an O-ring 57 is fitted in the recessed groove 56. Through intermediation of the O-ring 57, the annular member 37 is externally fitted to the outer peripheral surface of the large-diameter portion 40 of the power transmission shaft 25 and the outer peripheral surface of the tubular member 34.

With this, the annular member 37 not only has a mounting/dismounting function of fixing and separating the power transmission shaft 25 and the inner joint member 13, which is exerted by the mounting and dismounting mechanism 33, but also has a seal function of preventing leakage of lubricant sealed inside the joint and preventing entry of foreign matters from outside the joint, which is exerted by the boot 28 of the seal mechanism 27.

In the mounting and dismounting mechanism 33 having the above-mentioned configuration, along with movement of the annular member 37 in the axial direction, the pushing members 36 exposed from the outer peripheral surface of the tubular member 34 are moved in the radial direction. In this manner, the snap ring 35 is mountable to and dismountable from the power transmission shaft 25.

That is, in the constant velocity universal joint 11 according to this embodiment, by the mounting and dismounting mechanism 33 comprising the tubular member 34, the snap ring 35, the pushing members 36, and the annular member 37, fixation and separation of the power transmission shaft 25 and the inner joint member 13 are performed in the manner described below with reference to FIG. 5 to FIG. 7.

Figure 5:
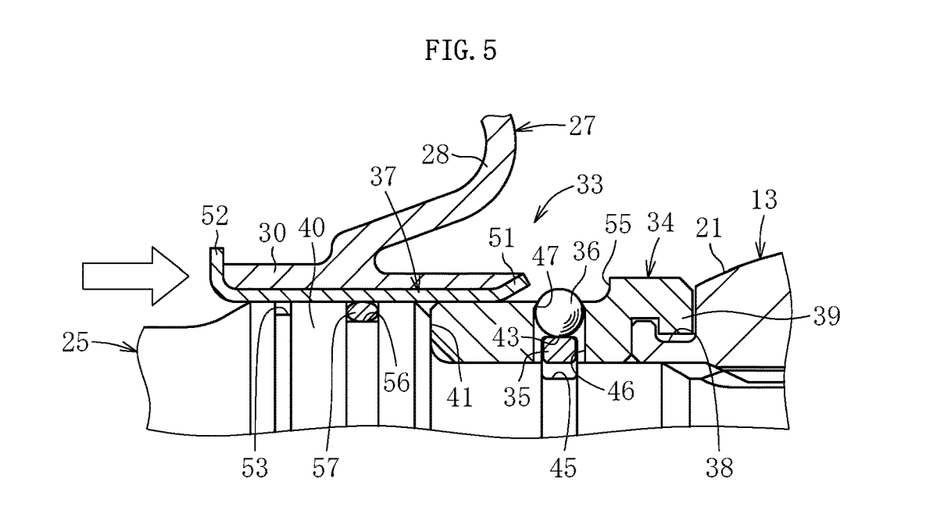
FIG. 5 is a sectional view for illustrating a state before the inner joint member is fixed to the power transmission shaft in a mounting and dismounting mechanism of FIG. 2.

FIG. 5 is an illustration of a state before the inner joint member 13 is fixed to the power transmission shaft 25. FIG. 6 is an illustration of a state in which the inner joint member 13 is in the middle of being fixed to the power transmission shaft 25. FIG. 7 is an illustration of a state after the inner joint member 13 is fixed to the power transmission shaft 25 (see FIG. 1 and FIG. 2).

Figure 4:
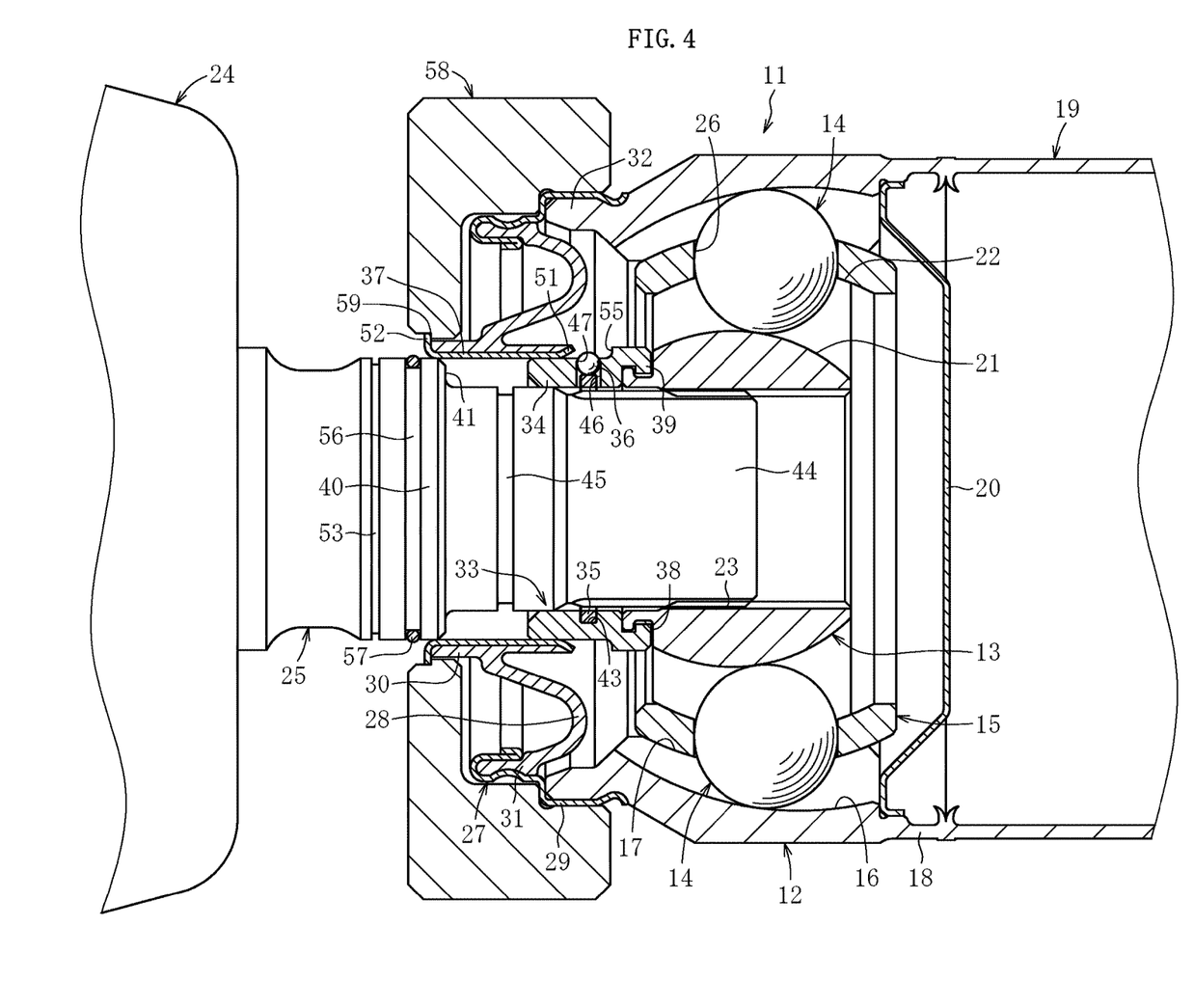
FIG. 4 is a sectional view for illustrating a state at the time when an inner joint member of the constant velocity universal joint is assembled to a power transmission shaft of a transmission.

First, prior to fixation of the inner joint member 13 to the power transmission shaft 25, the inner joint member 13 of the constant velocity universal joint 11 is assembled to the power transmission shaft 25 of the transmission 24. As illustrated in FIG. 4, the power transmission shaft 25 is inserted into the shaft hole 23 of the inner joint member 13, and the inner joint member 13 and the power transmission shaft 25 are coupled to each other by spline fitting so as to allow torque transmission therebetween. At this time, the power transmission shaft 25 is inserted until the stepped surface 41 of the large-diameter portion 40 of the power transmission shaft 25 is brought into abutment against the end portion on the transmission side of the tubular member 34.

At the time of insertion of the power transmission shaft 25, a jig 58 mounted to the metal ring 29 of the seal mechanism 27 is used. The jig 58 comprises a locking portion 59 configured to regulate movement of the annular member 37 of the mounting and dismounting mechanism 33 in the axial direction. The locking portion 59 is held in abutment against the inner side of the end portion 52 on the transmission side of the annular member 37.

Through use of the jig 58 as described above, movement of the annular member 37 in the axial direction (movement thereof in a direction of approaching the pushing members 36) along with the insertion of the power transmission shaft 25 is inhibited, and the annular member 37 can be fixed. In this manner, the inner joint member 13 is easily assembled to the power transmission shaft 25.

After the completion of the insertion of the power transmission shaft 25, the jig 58 is removed. The above-mentioned jig 58 is not necessarily required as long as the fixed state of the annular member 37 is maintained.

Next, at the time of fixing the inner joint member 13 to the power transmission shaft 25, as illustrated in FIG. 5, the snap ring 35 is in a state of being increased in diameter by an elastic force (free state), and the snap ring 35 received in the recessed groove 43 of the tubular member 34 presses the pushing members 36 to the radially outer side by the elastic force. Under this state, the pushing members 36 protrude and are exposed from the outer peripheral surface of the tubular member 34.

Figure 6:
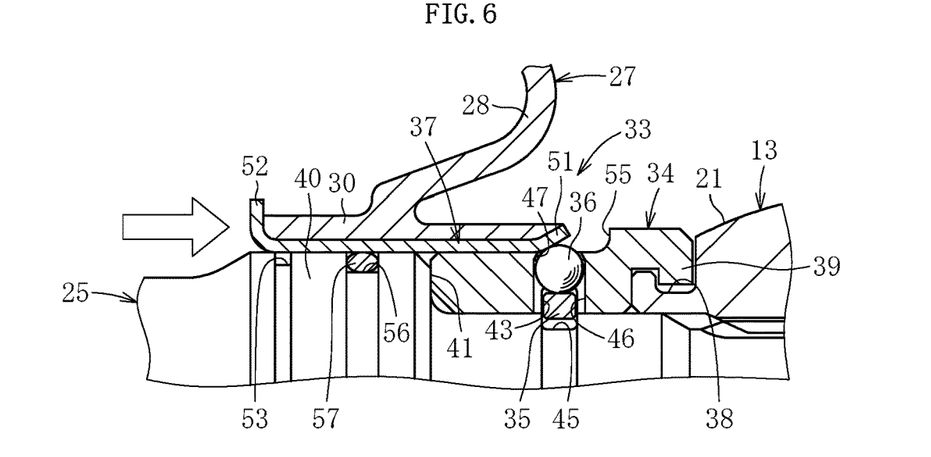
FIG. 6 is a sectional view for illustrating a state in which the inner joint member is in the middle of being fixed to the power transmission shaft in the mounting and dismounting mechanism of FIG. 2.

The annular member 37 is slid in the direction of approaching the pushing members 36 (to the propeller shaft 19 side) (see the outlined arrow in FIG. 5 and FIG. 6). As illustrated in FIG. 6, the end portion 51 on the propeller shaft side of the annular member 37 is brought into abutment against the pushing members 36 protruding from the outer peripheral surface of the tubular member 34.

When the annular member 37 is further slid in the axial direction from this state, the annular member 37 moves the pushing members 36 by pushing the pushing members 36 to the radially inner side. Through the movement of the pushing members 36 to the radially inner side, the snap ring 35 is reduced in diameter against the elastic force. At this time, the end portion 51 on the propeller shaft side of the annular member 37 is increased in diameter so as to be tapered. Thus, the pushing members 36 can be pushed smoothly.

Figure 7:
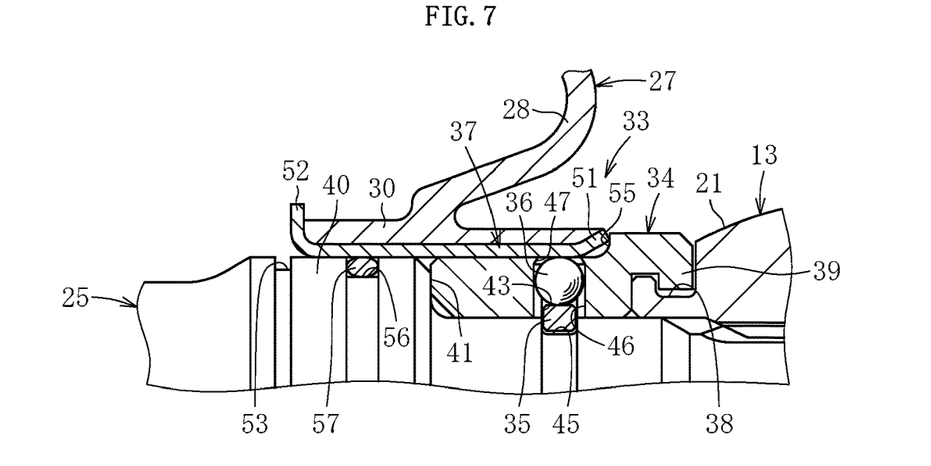
FIG. 7 is a sectional view for illustrating a state after the inner joint member is fixed to the power transmission shaft in the mounting and dismounting mechanism of FIG. 2.

As illustrated in FIG. 7, along with movement of the annular member 37 in the axial direction, the end portion 51 on the propeller shaft side of the annular member 37 is brought into abutment against the stepped portion 55 on the outer peripheral surface of the tubular member 34. Meanwhile, the inner peripheral side of the snap ring 35, which is fitted in the recessed groove 43 of the tubular member 34 through the reduction in diameter of the snap ring 35, is fitted in the recessed groove 45 of the power transmission shaft 25. In this manner, the snap ring 35 is locked to the recessed groove 43 of the tubular member 34 and the recessed groove 45 of the power transmission shaft 25.

The power transmission shaft 25 and the inner joint member 13 are fixed to each other by the snap ring 35 through intermediation of the tubular member 34. Then, the snap ring 54 is fitted in the recessed groove 53 of the power transmission shaft (see FIG. 2). In this manner, the fixation of the power transmission shaft 25 and the inner joint member 13 is completed.

In contrast, separation of the power transmission shaft 25 and the inner joint member 13 is performed through a procedure reverse to the procedure described above. That is, the snap ring 54 is removed from the recessed groove 53 of the power transmission shaft 25. Then, the annular member 37 is slid in a direction of separating from the pushing members 36 (to the transmission 24 side) (see FIG. 7).

When, along with movement of the annular member 37 in the axial direction, the annular member 37 pushing the pushing members 36 to the radially inner side is separated from the pushing members 36 (see FIG. 6), the snap ring 35 is increased in diameter by the elastic force, and the pushing members 36 protrude and are exposed from the outer peripheral surface of the tubular member 34 (see FIG. 5).

Through the increase in diameter of the snap ring 35, the inner peripheral side of the snap ring 35 is disengaged from the recessed groove 45 of the power transmission shaft 25, and the entire snap ring 35 is received in the recessed groove 43 of the tubular member 34. In this manner, the state in which the snap ring 35 is locked to the power transmission shaft 25 is released. From this state, the spline fitting portion 44 of the power transmission shaft 25 is pulled out from the shaft hole 23 of the inner joint member 13. In this manner, the separation of the power transmission shaft 25 and the inner joint member 13 is completed (see FIG. 4).

All of the components of the mounting and dismounting mechanism 33, which are used in the fixation and the separation of the power transmission shaft 25 and the inner joint member 13, that is, the tubular member 34, the snap ring 35, the pushing members 36, and the annular member 37 are not caused to be broken or significantly deformed, and hence repeated fixation and separation can be performed using the same components.

In the above-mentioned embodiment, the following structure is exemplified. Specifically, as the seal mechanism 27, the recessed groove 56 is formed in the outer peripheral surface of the large-diameter portion 40 of the power transmission shaft 25, and the O-ring 57 is fitted in the recessed groove 56 so that the inner peripheral surface of the annular member 37 is held in close contact with the O-ring 57. However, other structures may be employed.

Figure 8:
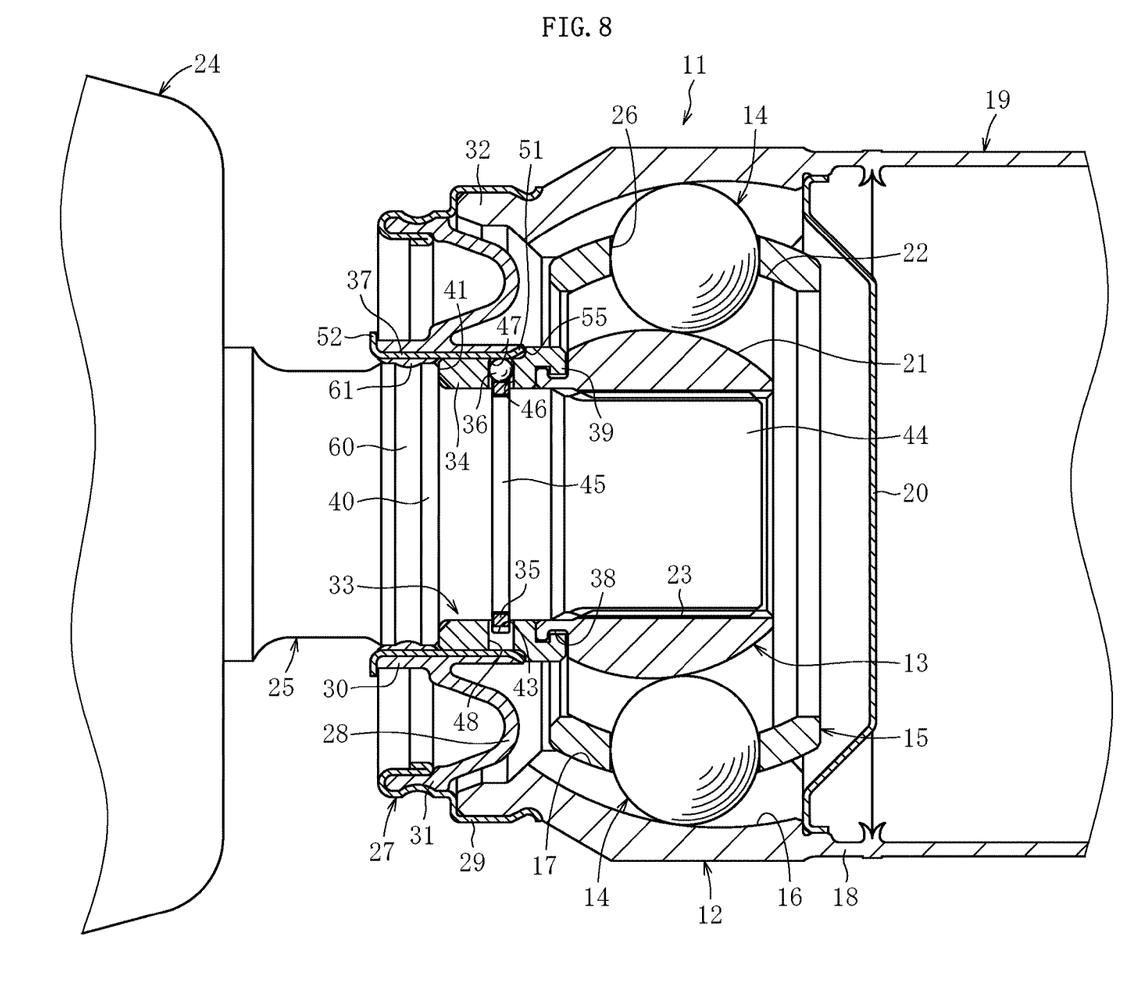
FIG. 8 is a sectional view for illustrating an overall configuration of a constant velocity universal joint according to another embodiment of the present invention.

For example, as illustrated in FIG. 8, an annular recess 60 is formed in the outer peripheral surface of the large-diameter portion 40 of the power transmission shaft 25, and, when the small-diameter end portion 30 of the boot 28 is to be bonded to the annular member 37 through vulcanization, a rubber member of the boot 28 is also bounded to the inner peripheral surface of the annular member 37 through vulcanization to form a seal portion 61.

The seal portion 61 is formed to have a projecting shape in conformity with the recessed shape of the recess 60 of the power transmission shaft 25. With this, the sealing property can be ensured, and the position of the annular member 37 in the axial direction with respect to the power transmission shaft 25 can be regulated.

As described above, through the projection and recess fitting of the seal portion 61 of the annular member 37 and the recess 60 of the power transmission shaft 25, the position of the annular member 37 in the axial direction can be regulated. However, as in the above-mentioned embodiment, the snap ring 54 may be fitted in the recessed groove 53 of the power transmission shaft 25, and a structure of locking the end portion 52 on the transmission side of the annular member 37 to the snap ring 54 may be additionally provided. With this configuration, the position of the annular member 37 in the axial direction can reliably be regulated. The boot is made of rubber, but may be made of resin.

The present invention is not limited to the above-mentioned embodiment. As a matter of course, the present invention may be carried out in various modes without departing from the spirit of the present invention. The scope of the present invention is defined in claims, and encompasses equivalents of description in claims and all changes within the scope of claims.

The invention claimed is:

1. A constant velocity universal joint, comprising:
  an outer joint member; and
  an inner joint member, which is configured to transmit torque between the inner joint member and the outer joint member through intermediation of torque transmission members while allowing angular displacement, wherein a power transmission shaft is coupled to the inner joint member so as to allow torque transmission therebetween, wherein a mounting and dismounting mechanism configured to mount and dismount the power transmission shaft to and from the inner joint member is provided between the inner joint member and the power transmission shaft, wherein the mounting and dismounting mechanism comprises:
- a tubular member, which is inserted externally on the power transmission shaft so as to extend to a power transmission shaft side of the inner joint member;
- a snap ring, which is mounted inside the tubular member, and is capable of being reduced in diameter;
- a pushing member, which is arranged on a radially outer side of the snap ring so as to be movable in a radial direction; and
- an annular member, which is arranged on an outer peripheral surface of the tubular member so as to be movable in an axial direction, and wherein the pushing member, which is exposed from the outer peripheral surface of the tubular member along with movement of the annular member in the axial direction, is movable in the radial direction so that the snap ring is mountable to and dismountable from the power transmission shaft.

2. The constant velocity universal joint according to claim 1,
wherein the mounting and dismounting mechanism has a locking groove at an end portion of the inner joint member, and a locking claw at an end portion of the tubular member, and wherein the locking claw of the tubular member is fitted in the locking groove of the inner joint member so that the inner joint member and the tubular member are coupled to each other.

3. The constant velocity universal joint according to claim 1,
wherein, in the mounting and dismounting mechanism, an annular recessed groove is formed in an outer peripheral surface of the power transmission shaft, and an annular recessed groove is formed in an inner peripheral surface of the tubular member in conformity with the recessed groove of the power transmission shaft, and wherein the snap ring is fitted in the recessed groove of the power transmission shaft and the recessed groove of the tubular member.

4. The constant velocity universal joint according to claim 1,
wherein, in the mounting and dismounting mechanism, through holes, which are opened to inner and outer peripheries of the tubular member, are formed at a plurality of positions of the tubular member in a circumferential direction, and the pushing member is a plurality of spherical pushing members arranged in the through holes, wherein radially inner sides of the plurality of spherical pushing members are brought into abutment against the snap ring, and wherein radially outer sides of the plurality of spherical pushing members are allowed to freely protrude and retreat with respect to openings on outer peripheral sides of the through holes.

5. The constant velocity universal joint according to claim 1, wherein, in the mounting and dismounting mechanism, the annular member is mounted to an end portion of a boot configured to close an opening of the outer joint member.

* * * * *